United States Patent [19]
Ozawa et al.

[11] Patent Number: 5,549,086
[45] Date of Patent: Aug. 27, 1996

[54] SLIDING CONTACT-MAKING STRUCTURES IN INTERNAL COMBUSTION ENGINE

[75] Inventors: Toshikazu Ozawa; Chizuko Imai; Hiromitsu Matsumoto, all of Iwata, Japan

[73] Assignee: Yamaha Hatsudoki Kabushiki Kaisha, Iwata, Japan

[21] Appl. No.: 451,998

[22] Filed: May 26, 1995

[30] Foreign Application Priority Data

Jun. 30, 1994  [JP]  Japan ................... 6-173624

[51] Int. Cl.$^6$ .................. C25D 7/04; C25D 5/02
[52] U.S. Cl. .................. 123/193.6; 123/193.2; 123/668
[58] Field of Search .................. 123/193.6, 193.4, 123/193.2, 668

[56] References Cited

U.S. PATENT DOCUMENTS

| | | | |
|---|---|---|---|
| 3,885,959 | 5/1975 | Badia et al. | 75/138 |
| 3,932,228 | 1/1976 | Sugiyama et al. | 204/26 |
| 3,945,893 | 3/1976 | Ishimori et al. | 204/16 |
| 3,981,781 | 9/1976 | Mori et al. | 204/16 |
| 4,666,786 | 5/1987 | Yano et al. | 428/544 |
| 5,154,433 | 10/1992 | Naruse | 277/224 |
| 5,162,065 | 11/1992 | Scott et al. | 148/438 |

FOREIGN PATENT DOCUMENTS

| | | |
|---|---|---|
| 0288364 | 10/1988 | European Pat. Off. . |
| 0641872 | 3/1995 | European Pat. Off. . |
| 2239411 | 7/1991 | United Kingdom . |
| 2272959 | 6/1994 | United Kingdom . |

*Primary Examiner*—David A. Okonsky
*Attorney, Agent, or Firm*—Knobbe, Martens, Olson & Bear

[57] ABSTRACT

Sliding contact-making structures of an internal combustion engine, which comprise (a) a cylinder unit having an inner plating coating containing a dispersoid substance such as a plating coating of Ni-P-SiC or Ni-SiC; and (b) a piston provided with at least one piston ring, fitted into the inside of the cylinder in the axial direction so as to freely slide upon the inside surface thereof, are characterized in that the piston ring has a surface in sliding contact with the inside surface, which surface is covered with a vapor deposition layer such as a physical vapor deposition layer of TiN or CrN, whereby resistance to friction abrasion and seize, and the friction coefficient can be effectively improved.

30 Claims, 7 Drawing Sheets

SLIDING CONTACT-MAKING STRUCTURES IN INTERNAL COMBUSTION ENGINE

BACKGROUND

1. Field of the Invention

This invention relates to sliding contact-making structures constituted by a cylinder and a piston of an internal combustion engine installed in an automobile, motorbike and the like, in particular, to such sliding contact-making structures allowing for abating friction loss between the inside surface of the cylinder and the sliding surface of the piston rings with the use of a decreased amount of lubricating oil. This invention also relates to an internal combustion engine comprising the above sliding contact-making structures, which has a compact and lightweight piston.

2. Background of the Art

In a combustion engine, a piston is fitted into a cylinder, and reciprocally slides upon the inside surface of the cylinder at a high speed at a high temperature when operated. As a result, frictional wear or seize tends to occur between the inside surface of the cylinder and the sliding surface of the piston. In order to prevent such a problem, a lubrication oil is normally supplied to the surfaces in sliding contact.

Further, it is hitherto known that the inside surface of the cylinder is finished with a honing (striation) treatment so as to form myriad grooves thereon to retain the lubricating oil externally supplied therein, whereby the effects of the lubricating oil on the surfaces in sliding contact is enhanced.

However, the following drawbacks are associated with the above structures:

First, the grooves must have a depth, e.g., a surface roughness of approximately 3 μmRz or more ("Rz" is defined in ISO 4287 or JIS B0601) sufficient for exercising lubricating effects of lubricating oil kept therein; otherwise, frictional wear or seize will occur due to insufficient retention of lubricating oil. As a result, the surface roughness of the inside surface is increased, thereby increasing coefficient of friction on the surfaces in sliding contact, notwithstanding the lubricating oil is used. Accordingly, due to friction loss occurring on the surfaces in sliding contact, engine performance suffers.

Secondly, consumption of lubricating oil which is supplied to the surfaces in sliding contact is inherently increased since the grooves formed by a honing treatment are deep to retain a sufficient amount of lubricating oil therein for abating the friction coefficient.

Thirdly, decrease in weight and size of a piston cannot be achieved since, especially in a cylinder with a high surface roughness, the sliding area of the piston must be enlarged by sufficiently extending the skirt area of the piston in the axial direction in order to reduce the pressure per area exerted on the piston; otherwise, frictional wear of the surfaces in sliding contact tends to be locally intensified due to high surface roughness of the inside surface of the cylinder. A long skirt area of the piston brings about increase in weight or size of the piston.

Fourth, in the case of a cylinder having a sleeve inserted inside, uneven pressure between the inside surface of the cylinder and the piston inherently occurs because the inside surface of the cylinder is prone to heat deformation due to low thermal conductivity of the cylinder (low diffusion of heat) as well as a difference in thermal expansion coefficients between the cylinder block (aluminum alloy) and the sleeve (ion cast) inserted inside the cylinder block. As a result, the sliding surface of the piston mainly touches a projected part of the inside surface of the cylinder. If the inside surface is coarse due to deep grooves, the surfaces in sliding contact will be locally and intensively worn out. Although a long skirt area of the piston mitigates the above problem by reducing the pressure per sliding area, it brings about increase in weight or size of the piston, which affects engine performance.

SUMMARY OF THE INVENTION

The present invention has exploited sliding contact-making structures in a cylinder and a piston which improve lubricity. An objective of the present invention is to provide sliding contact-making structures allowing for prevention of seize and friction abrasion without increasing the surface roughness of the inside cylinder surface. The sliding contact-making structures also allow for decreased friction loss occurring between the inside surface of a cylinder and the sliding surface of a piston, thereby improving engine performance. Concomitantly, the structures allow for decreased consumption of lubricating oil supplied to the surfaces in sliding contact, as well as decreased size and weight of the piston. In other words, the present invention is aimed at highly improving lubricity of the cylinder and the piston, thereby providing an internal combustion engine having improved engine performance.

Namely, one important aspect of the present invention is sliding contact-making structures of an internal combustion engine, comprising: (a) a cylinder unit having an inner plating coating containing a dispersed dispersoid substance; and (b) a piston provided with at least one piston ring, fitted into the inside of said cylinder in the axial direction so as to freely slide upon the inside surface thereof, said piston ring having a surface in sliding contact with the inside surface, said sliding surface covered with a vapor deposition layer. In the above structures, by employing a combination of the above-mentioned surfaces of the cylinder and the piston, resistance to friction abrasion and seize can be effectively improved. In particular, according to the above structure, even though the amount of a lubrication oil is lessened, seize can be prevented. In addition to the above effects, if the plating coating has been finished with a honing treatment so as to obtain a surface roughness of 2.0 μmRz or less, preferably 1.0 μmRz or less, the coefficient of friction between the inside surface of the cylinder and the sliding surface of the piston can be surprisingly reduced due to the low surface roughness of the inside surface, despite the fact that the amount of lubricating oil present on the inside surface of the cylinder is significantly lowered so that if a layer other than vapor deposition layers is used, the friction coefficient is increased and seize tends to occur. In other words, hitherto, although the lower the surface roughness, the lower the friction coefficient, it was impossible to lower surface roughness beyond a certain level because the friction coefficient is increased due to a shortage of lubricating oil.

In place of the above honing treatment, the plating coating can be finished with a plateau honing treatment. In this embodiment, the coefficient of friction between the inside surface of the cylinder and the sliding surface of the piston can be even lower due to the plateau surface of the piston ring.

In the present invention, due to resistance to friction abrasion and good lubricity, the skirt area of the piston can be reduced, thereby rendering the piston compact and lightweight. Accordingly, the engine performance can be significantly improved.

In the above sliding contact-making structures, if a nickel-based plating coating containing a silicon carbon dispersoid is used as a plating coating in combination with the deposition layer of the piston ring, lubricity and frictional properties of the surfaces in sliding contact can be improved. In addition, the hardness of the inside surface can be increased depending on the hardness of the deposition layer of the piston, by incorporating phosphorus into the nickel-based plating coating containing a silicon carbon dispersoid. Further, when an anodized aluminum film has been formed under the plating coating, overall frictional properties can be improved.

In the above sliding contact-making structures, if a physical vapor deposition layer, especially an ion plating deposition layer such as those of TiN and CrN, is used as a deposition layer on the piston ring in combination with the above plating coating, lubricity and frictional properties can be significantly improved.

Accordingly, an internal combustion engine comprising the above sliding contact-making structures, having an improved engine performance due to a reduced friction coefficient as well as a compact piston, can be provided. In a case of plural piston rings being installed, the piston ring on the combustion chamber side is preferably covered with a vapor deposition layer. The aforesaid sliding contact-making structures are advantageously adapted for a four-cycle engine which requires as little lubricating oil as possible.

DETAILED DESCRIPTION OF THE PREFERRED EMBODIMENT

Figure 1:
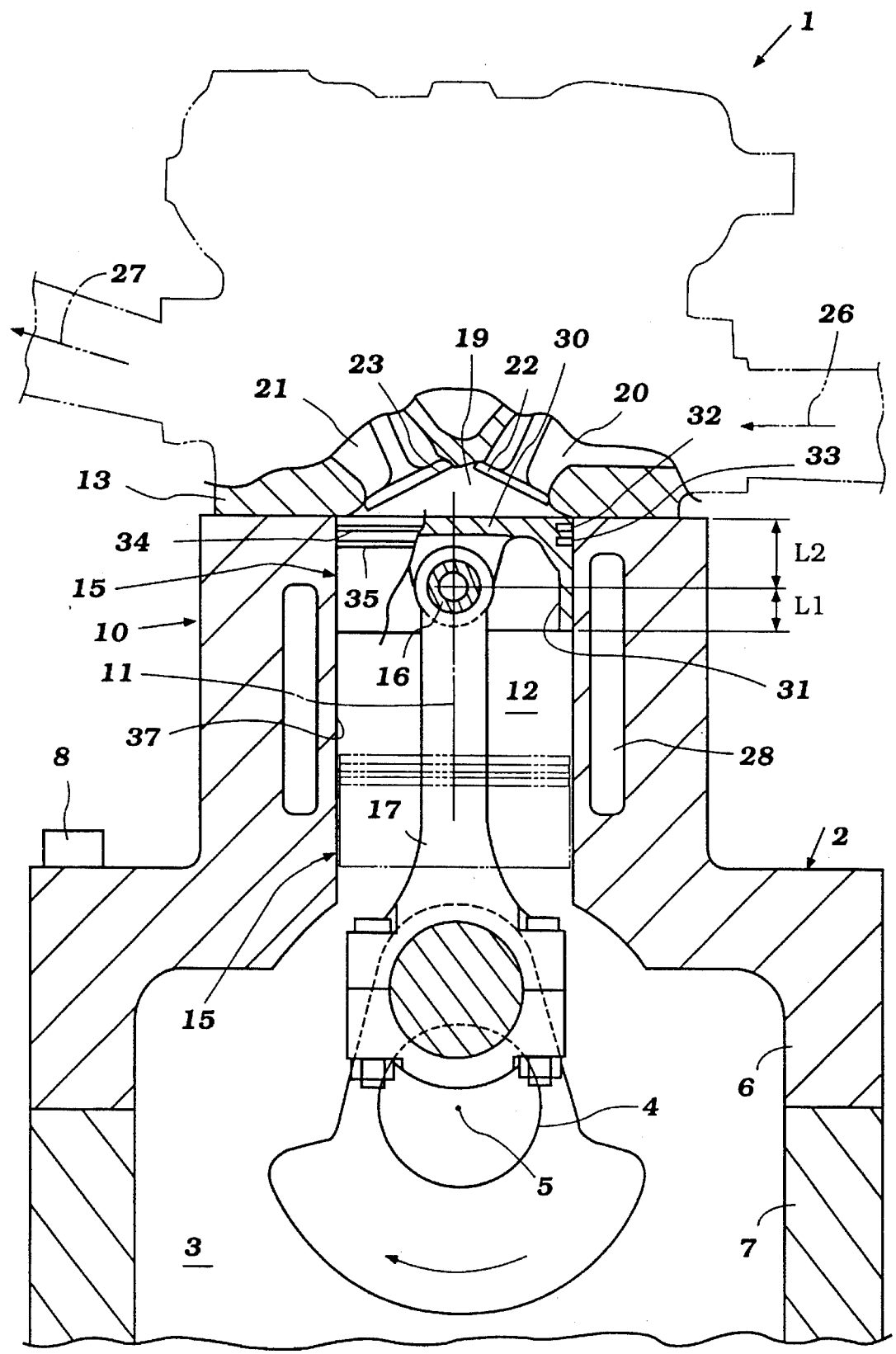
FIG. 1 is a schematic cross-sectional view (a part) showing one embodiment of an internal combustion engine having sliding contact-making structures of the present invention.

Sliding Contact-Making Structures in Internal Combustion Engine

Sliding contact-making structures of the present invention can be adapted for any internal combustion engine for any purpose, in which a piston slides upon the inside surface of a cylinder unit, such as automobile engines, motorcycle engines and lawn mower engines, regardless of whether they are two-cycle or four-cycle engines. However, the present invention is advantageously and preferably applied to a four-cycle engine since the four-cycle engine requires as little lubricating oil as passible. The piston has at least one piston ring, normally two (i.e., a compression ring and an oil ring) or three (i.e., a compression ring, second compression ring and oil ring), installed circumferentially along the piston body. The outermost area of the piston ring, i.e., the surface in sliding contact, slides upon the inside surface of the cylinder while touching the inside surface. Thus, the sliding contact-making structures are mainly composed of the inside surface of the cylinder and the sliding surface of the piston. A cylinder used in the present invention is a sleeveless cylinder plated with a plating coating. A sleeveless cylinder is lightweight, and not prone to heat deformation so that local frictional wear does not practically occur. A cylinder is compact and lighter when an aluminum alloy is used and plated with chrome or nickel to increase the abrasion resistance of the inside surface of the cylinder. Other alloys or even plastic, however, can be used for a cylinder unit.

Plating Coating on Inside Cylinder Surface

The plating coating should have sufficient lubricity, frictional properties, hardness and so forth, and from this point of view, a nickel-based or chrome-based plating coating, especially a nickel-based plating coating containing a dispersoid substance, is preferred. As a dispersoid-forming substance, ceramics such as silicon carbide and alumina can be used. For example, a nickel-based plating coating containing a silicon carbide dispersoid (preferably 0.2%–10% by weight), Ni-Sic, is preferably used. Alternatively, the nickel-based plating coating further containing phosphorus (preferably 0.5%–1% by weight), Ni-P-SiC, is preferably used to match the hardness of the sliding surface of a piston (discussed later). If the sliding surface of a piston is not hard, the plating coating need not contain phosphorus. The thickness of the plating coating can vary, but may be 10–200 µm prior to honing treatment. Although a preferable plating method will be discussed later, a flowing liquid plating method in which a plating liquid is permitted to flow on the inside surface to be plated at a high speed can be employed. According to the flowing liquid plating method, an anodized aluminum film (i.e., alumite) can be formed under the plating coating in order to improve frictional properties and adhesion strength between the plating coating and the surface of the cylinder material. The alumite has a porous and durable structure, and thus a plating coating can be firmly deposited on the cylinder surface. The thickness of the alumite is in the approximate range of from 1 to 2 µm.

The plating coating should cover the area in which an upper piston ring (compression ring) slides, i.e., the area from the point the upper piston ring reaches when the piston is at the upper dead point position, to the point the upper piston ring reaches when the piston is at the lower dead point position, because the upper piston ring is close to the combustion chamber and thus easily heated due to combustion heat.

Honing Finishing

In one embodiment of the present invention, the inside surface of a cylinder has been finished with a honing treatment so as to obtain a surface roughness of 2.5 μmRz or less, preferably 2.0 μmRz or less, more preferably 1.0 μmRz or less. The minimum surface roughness can be determined by the minimum depth of grooves formed by the honing treatment, and normally determined to be 0.2 μmRz, for example. The units "μmRz" is defined in ISO 4287. Hitherto, the surface roughness of the inside surface of a cylinder had to be at least approximately 3.0 μmRz in order to obtain sufficient lubricity by retaining lubricating oil thereon in an amount sufficient for averting frictional wear and seize. If the surface roughness was lower than the above, frictional wear and seize would occur in many cases. If the surface roughness is high, as discussed earlier, the friction coefficient between the inside surface of a cylinder and the sliding surface of a piston will be increased, despite the use of lubricating oil, thereby accelerating localized friction abrasion of the piston ring. In the present invention, by employing the specific combination, a plating coating containing a dispersoid substance for the cylinder side and a physical or chemical vapor deposition layer for the piston side, it is possible to significantly improve lubricity therebetween, thereby allowing for decrease in the amount of lubricating oil supplied to the surfaces in sliding contact, as well as decrease in the friction coefficient. As described above, in the present invention, the surface roughness is normally 2.5 μmRz or less, preferably 2.0 μmRz or less, and more preferably 0.2–1.0 μmRz. If the surface roughness is 2.5 μmRz or less, while consumption of lubricating oil is lessened, lubricity can be improved, and frictional wear and seize can be effectively prevented. If the surface roughness is 1.0 μmRz or less, the friction coefficient is considerably reduced, leading to improvement on engine performance and fuel economy. To a certain degree, the friction coefficient relates to surface roughness, and the lower the surface roughness is, the lower the friction coefficient. However, if a coating material other than vapor deposition layers is used for the sliding surface of a piston ring in combination with a plating coating on the inside surface of a cylinder, the friction coefficient is not continuously decreased, but rather increased in many cases, when the surface roughness is reduced beyond a certain level, e.g., 1.0 μmRz. When reduced beyond the level, the amount of lubricating oil present between the inside surface and the sliding surface becomes too small, resulting in a detrimental increase in the friction coefficient or seize-like phenomenon in some cases. In contrast, if a vapor deposition layer is used for the sliding surface of a piston ring in combination with a plating coating containing a dispersoid substance, the friction coefficient can be continuously reduced corresponding to decrease in surface roughness especially below 1.0 μmRz. In other words, if a vapor deposition layer is used, good lubricity can be maintained despite a decrease in lubricating oil. Thus, resistance to seize is improved within a wide range of surface roughness, e.g., even at 3.0 μmRz. In the above embodiment, lubricity can be markedly improved with the use of a minimum amount of lubricating oil.

Plateau Honing Finishing

In another embodiment of sliding contact-making structures in the present invention, the inside surface on a cylinder is finished with a plateau honing treatment in place of the above-mentioned honing treatment. In this embodiment, because each groove formed on the surface has a plateau area, the friction coefficient can be even lower than in the aforesaid embodiment. The grooves can be deep so as to retain a sufficient amount of lubricating oil therein. The amount of lubricating oil is expected to be smaller than that in the aforesaid embodiment without plateaus since the friction coefficient can be lower. A plateau honing treatment can easily be performed by a combination of a honing treatment and a plateau treatment. That is, after a honing treatment, the points on the surface are reduced so as to obtain plateau areas between grooves next to each other rendering trapezoidal-shaped ridges. In cross-section, the trapezoidal shape can be defined by the ratio of the length of a transverse line parallel to the bases of the ridges at a given depth in the grooves, to the length of the bases, in the direction traversing the grooves. Based on the measurement, the ratio is preferably 80% at a depth of 0.4–0.8 μm, for example. Other aspects of this embodiment such as a physical or chemical vapor deposition layer to be used and a plating coating to be used are the same as those of the aforesaid embodiment without a plateau area. Lubricity can be improved with the use of a reduced amount of lubricating oil, thereby improving the engine performance and contributing to realization of a compact piston (i.e., the skirt area can be shortened).

Vapor Deposition Layer on Piston Ring

As described above, in the present invention, the sliding surface of a piston ring is coated with a physical or chemical vapor deposition layer. A piston has at least one piston ring, normally two or three. In any case, the most important piston ring is the uppermost ring which mainly seals the inside cylinder surface communicated with the combustion chamber. Thus, preferably, at least the uppermost piston ring is coated with a vapor deposition layer. For example, in a case of three piston rings, i.e., a compression ring (upper piston ring), second compression ring (middle piston ring) and oil ring (lower piston ring), the compression ring is coated with a vapor deposition layer, the second compression ring is coated with a Cr plating, and the oil ring is covered with nitrided SUS. The physical or chemical vapor deposition layer is conspicuously effective in improving lubricity and frictional properties such as resistance to seize, friction abrasion and friction coefficient, in combination with the use of a plating coating of the inside surface of a cylinder. These effects are enhanced when the surface roughness of the inside surface of a cylinder is 2.0 μmRz or less, preferably 1.0 μmRz or less. In particular, the friction coefficient is markedly reduced at a surface roughness of 1.0 μmRz or less. However, even when the surface roughness is as high as 3.0 μmRz, friction abrasion can be improved when a vapor deposition layer is used. Physical vapor deposition layers can be formed by various vacuum plating methods such as an ion plating method and an arc plating method. Chemical vapor deposition layers can be formed by various CVD methods such as a low pressure CVD and a Plasma CVD. A physical vapor deposition layer, especially an ion plating deposition layer, is preferably used in view of stability, lubricity and durability in combination with a plating coating deposited on the inside surface of a cylinder. As a physical vapor deposition layer, those of TiN and CrN are preferably exemplified. The thickness of a physical or chemical vapor deposition layer is normally in the range of 1–100 μm, depending on material. For example, in the case of a TiN layer, the thickness thereof is preferably 1–5 μm, and in the case of a CrN layer, that is preferably 1–50 μm.

Plating Method

Any plating method which allows for formation of a plating coating containing a dispersoid substance can be adapted for a plating coating of the inside surface of a cylinder. However, a high speed plating method, i.e., a flowing liquid plating system or a circulation plating system, is preferably employed in the present invention. For example, a plating liquid such as a nickel sulfamate bath or a nickel sulfate bath which optionally contains phosphorus of 0.1–0.3 g/l is permitted to flow on the surface of a cylinder at a plating liquid flow rate of 1.0 to 7.0 meters per second (preferably 2.0 to 6.0 meters per second) while impressing a voltage between an electrode and the surface at an electric current density of 20 to 400 $A/dm^2$ (preferably 50 to 300 $A/dm^2$). During plating, the flow rate and the electric current density can be changed continuously or at intervals so as to change the distribution of a dispersoid substance in the plating coating.

Other Features

In the present invention, the friction coefficient between the inside surface of a cylinder and the sliding surface of a piston is lowered. Thus, the area of the piston touching the inside surface of the cylinder can be reduced since localized friction abrasion does not easily take place even if the piston slides, to a certain extent, unequally upon the inside surface. Accordingly, the length of the piston in the axial direction can be shortened. For example, the length L1 between the center of a piston pin and the lower end of the skirt area can be one third to two thirds of the length L2 between the upper end of the piston and the center of the piston pin, thereby reducing the length of the piston in the axial direction as compared with the diameter of the piston. The ratio of L1/L2 is normally designed to be 4/5–1/1 in conventional pistons of commercially available automobiles for the sake of diffusing the pressure occurring between the inside surface of a cylinder and the sliding surface of a piston; otherwise durability of the piston and/or the cylinder is shortened due to uneven sliding. In the present invention, the friction coefficient can be sufficiently lowered, and thus the ratio can be 1/3–2/3, thereby realizing a compact piston. By reducing the friction coefficient and the size or weight of a piston, the engine performance or fuel economy can be significantly improved.

EXAMPLE 1

Combustion Engine with Honing Finishing Sleeveless Cylinder and Deposition Layer Formed Piston Combustion Engine FIG. 1 is a schematic cross-sectional view (a part) showing one embodiment of an internal combustion engine having sliding contact-making structures of the present invention. An engine 1 depicted in the Figure is a four-cycle internal combustion engine in which gasoline is used as fuel. The internal combustion engine 1 has a crankcase 2. A crankshaft 4 is accommodated in a crank room 3 of the crank case 2, and the crankshaft 4 is pivoted in the crankcase 2 so as to freely rotate around a shaft center 5. The crankcase 2 is composed of two separate portions, i.e., an upper case 6 and a lower case 7, which are physically integrated using an integration device 8 so that these portions can be freely put on and taken off. A cylinder unit 10 which is formed on the upper case 6 is integrally shaped together with the upper case 6, using an aluminum alloy. The cylinder unit 10 has a cylinder bore 12 having a circular cross-section in the direction that a longitudinal axis 11 is upright. The inside surface of the cylinder bore is formed of a plating coating; no sleeve is installed. The bottom of the cylinder bore 12 is communicated with the crank room 3, and the upper end of the cylinder bore 12 is closed with a cylinder head 13. The cylinder head 13 is fixed on the upper end of the cylinder unit 10 in such a way that the head can be freely put on and taken off. A piston 15 is fitted into the cylinder bore 12 of the cylinder unit 10 in such a way that the piston can slide freely in the vertical direction. A connecting bar 17 connects the crankshaft 4 at one end, and the piston 15 via a piston pin 16 at the other end. Accordingly, the crankshaft 4 and the piston 15 are connected so as to operate together via the connecting bar 17. In the cylinder bore 12, the space surrounded by the cylinder head 13 and the piston 15 constitutes a combustion chamber 19. An inhalation port 20 and an exhaust port 21 which connects the combustion chamber 19 and the outside of the cylinder head 13 are disposed in the cylinder head 13. In the inhalation port 20 and the exhaust port 19, an inhalation valve 22 and an exhaust valve 23 are placed for opening and closing these ports. The combustion chamber 19 is provided with an ignition plug (not shown). When the piston 15 goes down and the exhaust valve 22 is open, a mixed gas 26 is introduced into the cylinder bore 12 via the inhalation port 20. When the piston 15 goes up, the gas is compressed, and ignited with the ignition plug. Accordingly, the internal combustion engine 1 is operated, and energy is output via the crankshaft 4. The exhaust gas 27 generated by ignition and combustion is discharged through the exhaust port 21 when the exhaust valve 23 is open. In addition, the cylinder unit 10 is provided with a cooling jacket 28 which prevents the cylinder unit 10 from being overheated due to combustion heat.

In the present invention, the friction coefficient between the inside surface of the cylinder unit and the sliding surface of the piston can be significantly lowered as described later. Thus, the area of the piston 15 touching the inside surface 37 of the cylinder unit 10 can be reduced since localized friction abrasion does not easily take place even if the piston slides, to a certain extent, unequally upon the inside surface. In other words, the length of the piston 15 in the axial direction can be shortened. In this embodiment, as depicted in FIG. 1, the length L1 between the center of the piston pin 16 and the lower end of the skirt area 31 is approximately half of the length L2 between the upper end of the piston 15 and the center of the piston pin 16.

The inside surface of the cylinder 37 is formed of the plating coating. The plating coating covers the area in which the upper piston ring (compression ring) 34 slides, i.e., the area from the point the compression ring 34 reaches when the piston 15 is at the upper dead point position (indicated with a solid line in FIG. 1), to the point the compression ring 34 reaches when the piston 15 is at the lower dead point position (indicated with a broken line in FIG. 1), because the compression ring 34 is close to the combustion chamber 19 and thus easily heated due to combustion heat.

Sliding Structures

Figure 2:
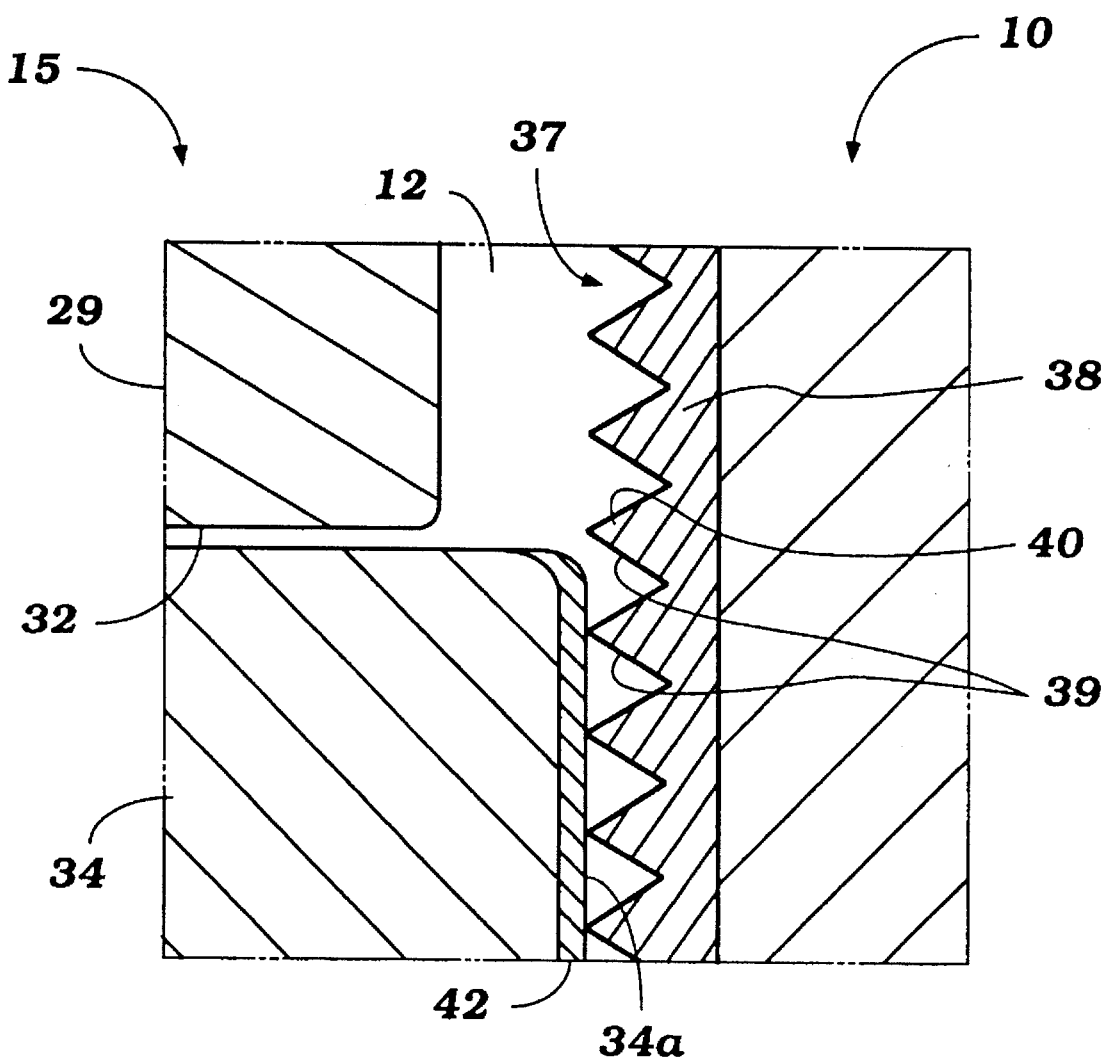
FIG. 2 is a schematic enlarged vertical cross-sectional view illustrating one embodiment of sliding contact-making structures according to the present invention, in which a piston ring coated with a deposition layer, a piston body and a cylinder unit having a plating coating thereon are shown.

FIG. 2 is a schematic enlarged vertical cross-sectional view illustrating one embodiment of sliding contact-making structures according to the present invention, in which a piston ring coated with a deposition layer, a piston body and a cylinder unit having a plating coating thereon are shown. In the Figure, the piston 15 has a piston body 29 whose longitudinal axis is coordinated with the longitudinal axis 11 of the piston itself. The piston body 29 is made of an aluminum alloy, and comprises a piston head 30 in a disc shape and a skirt area 31 which extends downwards in the longitudinal axial direction from the outer surface of the piston head 30 (FIG. 1). An upper ring groove 32 and a lower ring groove 33 are provided at an interval on the outer surface of the piston body 29 near the bottom of the combustion chamber 19. The compression ring 34 and an oil ring (lower piston ring) 35 are fitted into the upper ring groove 32 and the lower ring groove 33, respectively, in such a way that the rings can be freely put on and taken off. The outer surfaces of the compression ring 34 and oil ring 35 can freely slide in the longitudinal axial direction upon an inside surface 37 of the cylinder bore 12 while pressing on the inside surface 37. Thus, the outer surfaces of the compression ring 34 and oil ring 35 function as sliding surfaces upon the inside surface 37, and keep the combustion chamber 19 airtight.

The cylinder unit 10 has been plated by a method described later so as to deposit a plating coating of Ni-P-SiC or Ni-SiC 38 to obtain the inside surface 37 (the thickness of the plating coating prior to honing treatment was 100 μm). Before depositing the plating coating, a porous alumite (anodized aluminum film) layer (not shown) was underlaid in a pretreatment process as described later. The inside surface 37 having the plating coating 38 has been finished with a honing treatment so as to obtain myriad grooves 39 circumferentially formed using the longitudinal axis 11 as a central axis, as well as projections 40 between adjacent grooves 39 on the inside surface 37. This schematic Figure does not represent the actual size or relative size of the grooves, and exaggerates the shapes. The surface roughness of the inside surface 37 finished with a honing treatment is set at 2.0 μmRz or less. In FIG. 2, the sliding surface 34a of the compression ring 34 has a deposition (physical vapor deposition: PVD) layer of TiN or CrN 42 by an ion plating method (the thickness of the TiN depostion layer and that of the CrN deposition layer were 2–5 μm and 2–25 μm, respectively). Accordingly, when the sliding surface 34a slides upon the inside surface 37, the deposition layer 42 slides upon the plating coating 38 finished with a honing treatment.

Plating Method

Figure 3:
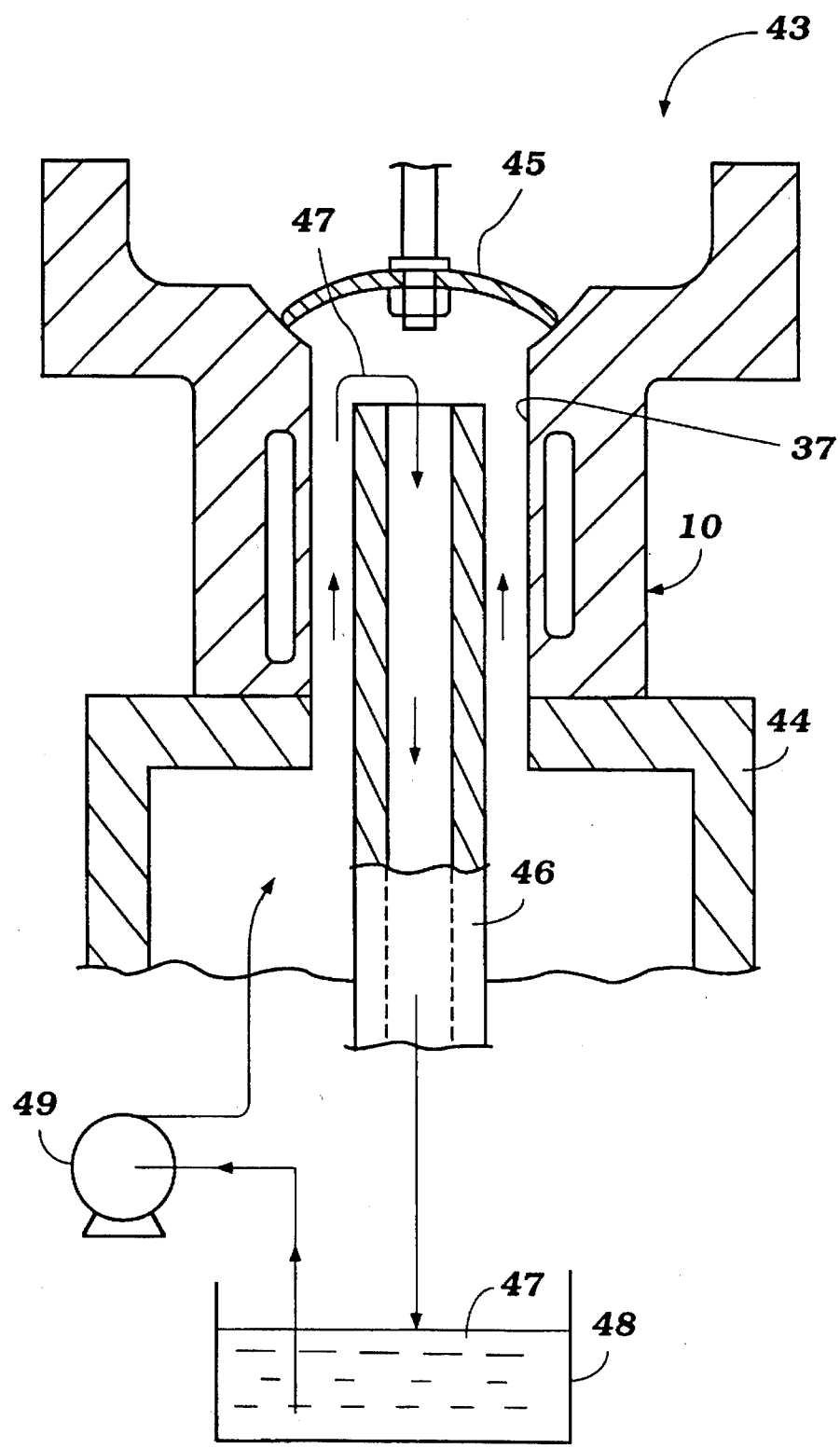
FIG. 3 is a schematic view (a part) illustrating a plating system adapted to plate the inside surface of the cylinder unit usable in the present invention, in which the cylinder unit is placed upside down (the side of a crank shaft is up in the Figure).

FIG. 3 is a schematic view (a part) illustrating a plating system adapted to plate the inside surface of the cylinder unit usable in the present invention, in which the cylinder unit is placed upside down (the side of a crank shaft is up in the Figure).

A plating apparatus 43 is provided with a base 44 on which a cylinder unit 10 stands, a lid 45 for closing the upper opening of a cylinder bore 12 of the cylinder unit 10, and a pipe 48 which is inserted into the cylinder bore 12 through the lower opening of the cylinder bore 12. The plating apparatus is also provided with a tank 48 for storing a plating solution 47, and a pump 49 for pumping the plating solution 47 out of the tank 48 to the inside of the cylinder bore 12. When the pump 49 is operated, the plating solution 47 in the tank 48 is supplied to the cylinder bore 12, and then the plating solution 47 is returned to the tank 48 through the pump 49. A voltage is impressed between the cylinder unit 10 and the pipe 46. While the plating solution 47 flows upwards in the cylinder bore 12 along the inside surface 37 in the longitudinal axial direction, electric plating is conducted on the inside surface 37 so as to form a plating coating 38.

Figure 4:
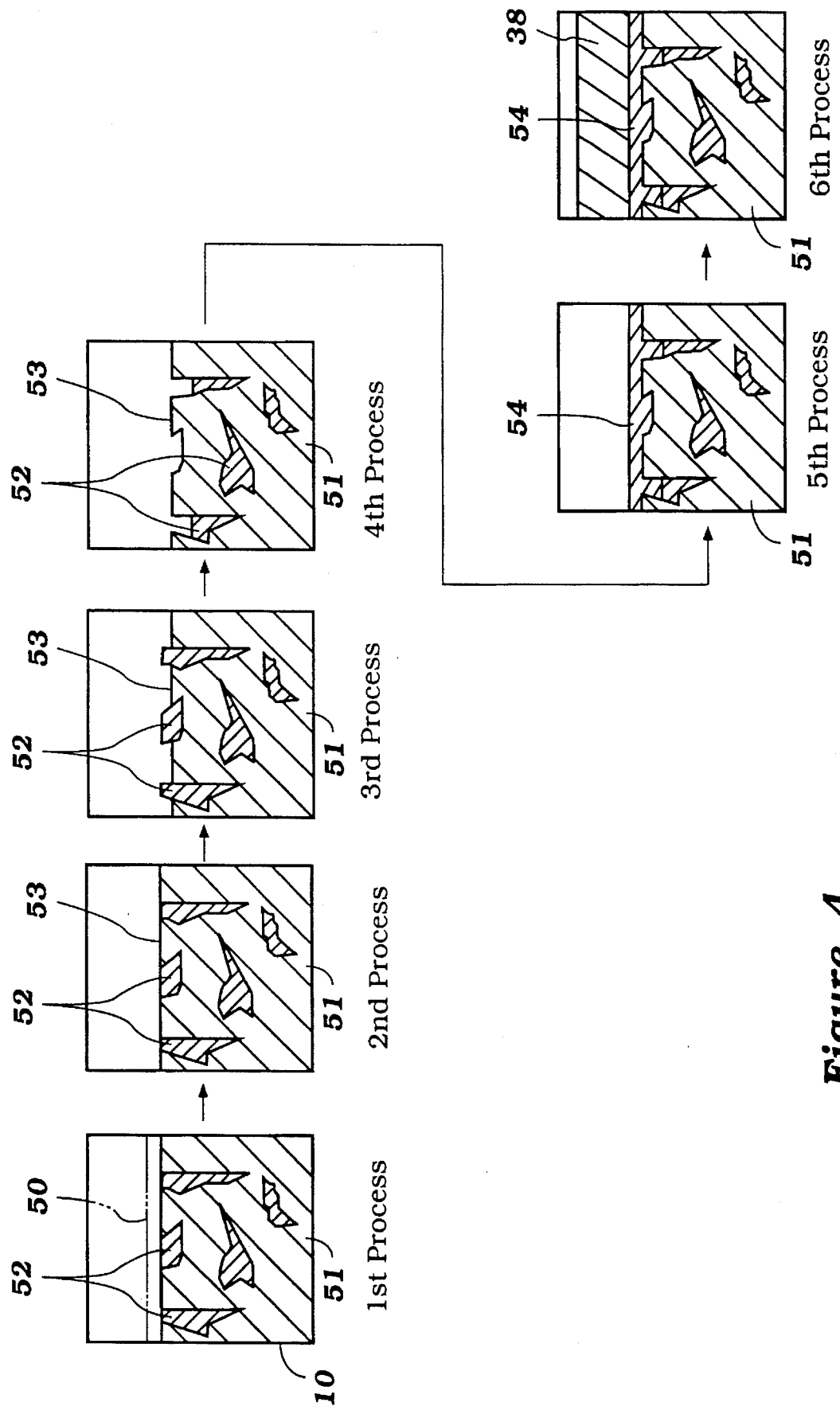
FIG. 4 is a flow chart showing steps of a plating system adapted to form the plating coating on the inside surface of the cylinder according to the present invention, in which schematic enlarged cross-sectional views (a part) of the inside surface of the cylinder are indicated step by step.

FIG. 4 is a flow chart showing steps of a plating system adapted to form the plating coating on the inside surface of the cylinder according to the present invention, in which schematic enlarged cross-sectional views (a part) of the inside surface of the cylinder are indicated step by step.

In the first process, the surface 50 of the cylinder bore 12 of the cylinder unit 10 is cut away in a machining process. In this case, the cross-sectional view of the cylinder unit 10 is schematically illustrated in which an aluminum base material 10 and Si 52 are shown. In the second process, the surface 53 is degreased after the machining process. In the third process, the surface 53 is subjected to alkali etching using a flowing etching solution which dissolves a little of the aluminum base material 51 on the surface 53. In the fourth process, mixed acid etching is implemented on the surface 53 using a flowing etching solution which further dissolves the Si 52 on the surface 53. In this embodiment, the plating solution is in a flowing state with respect to the inside surface 37, and in the fifth process, a porous alumite layer 54 is formed on the surface 53. In a sixth process, the Ni-P-SiC plating layer 38 is formed on the surface of the alumite layer 54.

By contrast, in the prior art, the flowing etching solution of the above described first through fourth processes is not used. In addition, the ensuing process shown in FIG. 4 is different for this embodiment from conventional processes. To wit, in the prior art, the plating solution 47 for the inside surface 37 is left in a static condition. After the fourth process, a fifth process lays down a zinc film on the etched surface. In a sixth process, the zinc film is etched and removed with nitric acid. In a seventh process, a zinc film is reformed by a second zinc substitution, and in an eighth process, a plating layer 38 of Ni-P-SiC is formed over the zinc film.

In addition to high plating speed and uniformity of Ni-P-SiC coating, the adhesion strength is better when the above alumite method is employed as the pretreatment method than it is where the above conventional zinc substitution method is employed. Further, the number of process steps is lower than in the prior art, thereby making the plating operations easier.

EXAMPLE 2

Simulation on Friction Coefficient

Figure 5:
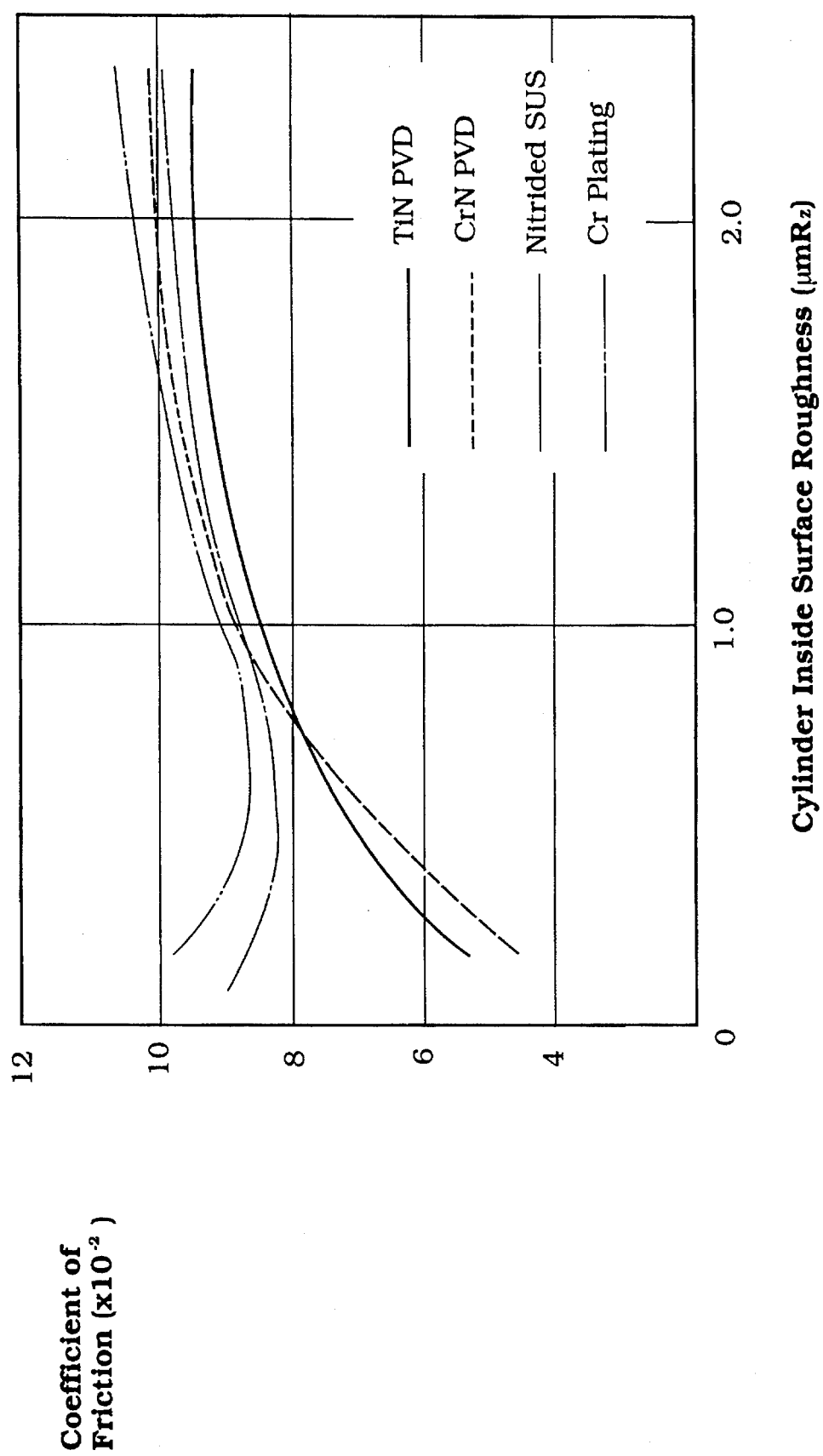
FIG. 5 is a graph showing the relationship between the coefficient of friction and the surface roughness in a simulation model in which material identical to the sliding surface of the piston ring slides upon material identical to the inside surface of the cylinder under conditions equivalent to the actual operation of an internal combustion engine, and in which TiN PVD (physical vapor deposition), CrN PVD, nitrided SUS and Cr plating were used as a deposition layer on the sliding surface of the piston.

FIG. 5 is a graph showing the relationship between the coefficient of friction and the surface roughness in a simulation model in which material identical to the sliding surface of the piston ring slides upon material identical to the inside surface of the cylinder under conditions such as the amount of lubricating oil and pressure exerted on the sliding surface being equivalent to those in the actual operation of the internal combustion engine depicted in FIGS. 1 and 2, and in which the above-mentioned TiN PVD and CrN PVD, nitrided SUS and Cr plating (thickness of 50–200 μm) were used as a deposition layer on the sliding surface of the piston. As clearly shown in FIG. 5, in the case of nitrided SUS and Cr plating, when the surface roughness of the inside surface of the cylinder was less than 1.0 μmRz, the friction coefficient was markedly increased. In contrast, in the case of TiN PVD and CrN PVD, when the surface roughness was less than 1.0 μmRz, the friction coefficient was markedly decreased. Thus, TiN PVD and CrN PVD can exhibit good lubricity with relatively little lubricating oil, and resistance to seize is improved within a wide range of surface roughnesses, e.g., even at 3.0 μmRz. When the surface roughness was approximately 2.0 μmRz, the above four layers exhibited friction coefficients similar to each other. However, in the case of TiN PVD and CrN PVD, resistance to seize can remain the same even at a surface roughness of 2.0 µmRz, and further, TiN PVD and CrN PVD are both harder than nitrided SUS or Cr plating. Thus, TiN PVD and CrN PVD surpass nitrided SUS and Cr plating in terms of resistance to friction abrasion and seize, even at a surface roughness of 2.0 µmRz or more. In particular, TiN PVD demonstrated a lower friction coefficient than SUS nitrided or CrN plating throughout a range of surface roughnesses. When the surface roughness is 1.0 µmRz or less, consumption of lubricating oil can be significantly decreased. Thus, by using a physical or chemical vapor deposition layer such as that of TiN or CrN in combination with a plating coating such as that of Ni-P-Si or Ni-Si, it is possible to improve lubricity with a minimized amount of lubricating oil.

EXAMPLE 3

Plateau Honing Finishing

Figure 6:
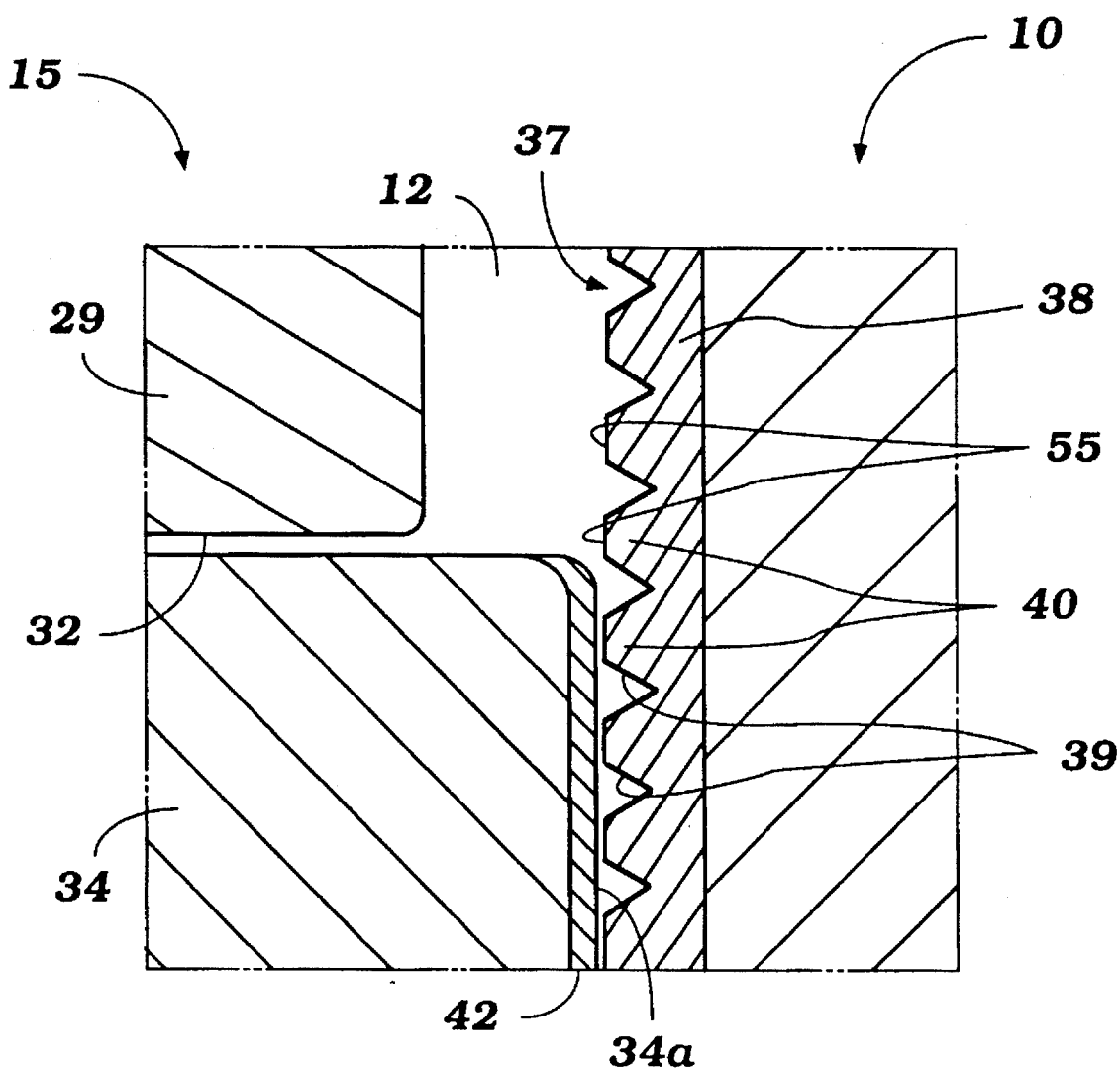
FIG. 6 is a schematic enlarged vertical cross-sectional view illustrating another embodiment of sliding contact-making structures according to the present invention, in which a piston ring coated with a deposition layer, a piston body and a cylinder unit having a plating coating thereon are shown.
Figure 7:
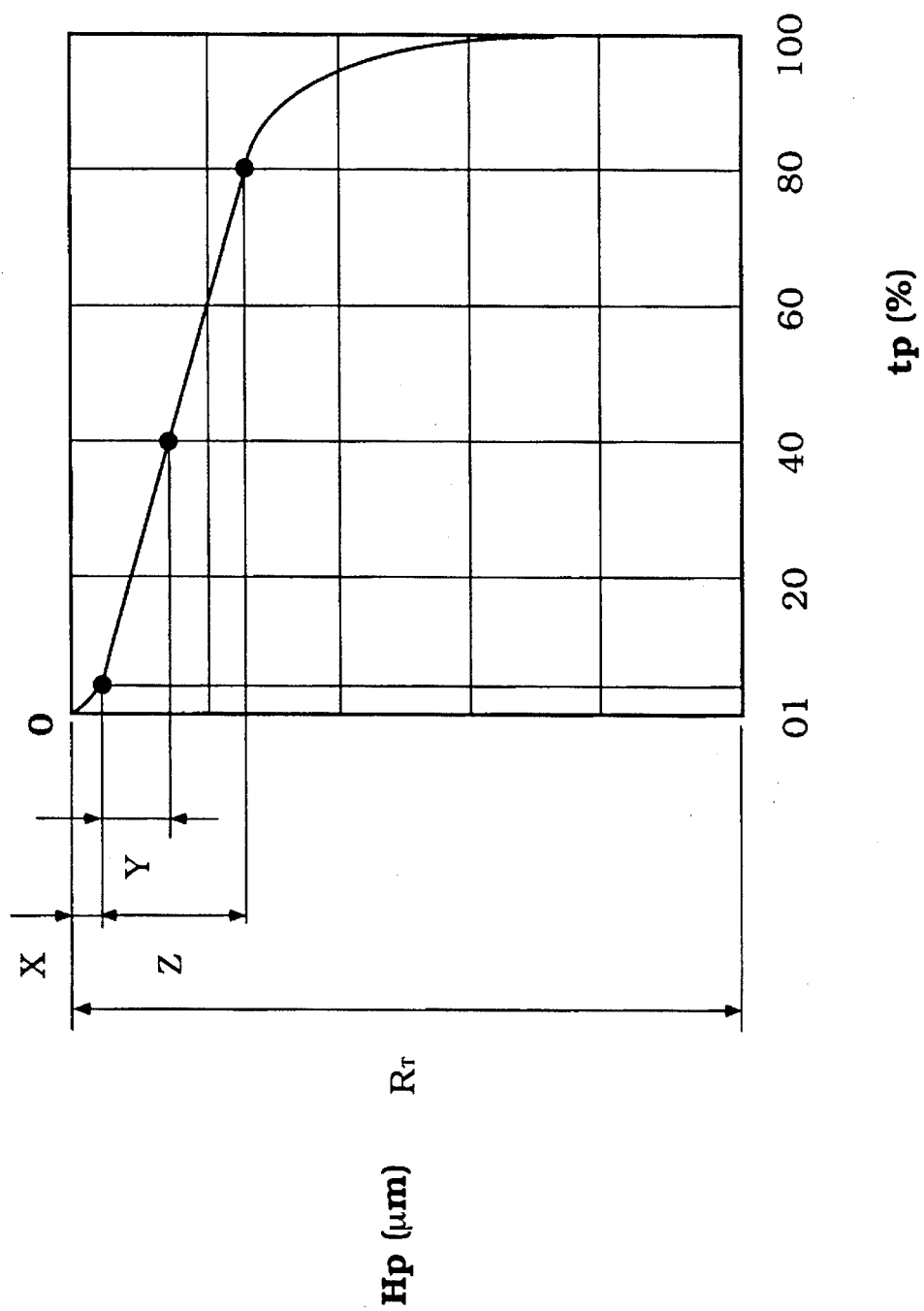
FIG. 7 is a graph showing one embodiment of a shape formed on the inside surface of the cylinder by a plateau honing treatment.

FIGS. 6 and 7 show a second embodiment of the present invention. FIG. 6 is a schematic enlarged vertical cross-sectional view illustrating another embodiment of sliding contact-making structures according to the present invention, in which a piston ring coated with a deposition layer, a piston body and a cylinder unit having a plating coating thereon are shown. FIG. 7 is a graph showing one embodiment of a shape formed on the inside surface of the cylinder by a plateau honing treatment.

As depicted in FIG. 6, the peaks 55 of the projections 40 between adjacent grooves 39 are flattened. Table 1 shows the preferable shapes of the projections 40. In the Table, "Scanning range L" means the scanning length in the direction traversing the grooves, "$T_p$" denotes the ratio of the length of a transverse line parallel to the bases of the ridges at a given depth in the grooves, to the length of the bases, in the direction traversing the grooves (i.e., in the scanning direction), and "$H_p$" denotes the depth of a given point in the grooves. In the Table, the maximum height $R_T$ is 1.0–1.8 µm, meaning that the depth of the grooves are sufficiently deep to retain an appropriate amount of lubricating oil and lower the friction coefficient. In practice, $R_T$ can be 2.0–3.0 µm, and Z can be maximum 0.8–1.5 µm to maintain good lubricity. The other structures and functions are the same as those in Example 1.

TABLE 1

Scanning range L = 0.8 mm

| | $T_p$ | $H_p$ |
| --- | --- | --- |
| $R_T$: | 100% | 1.0–1.8 µm |
| X: | 0–1% | maximum 0.1 µm |
| Y: | 1–40% | maximum 0.4 µm |
| Z: | 1–80% | 0.4–0.8 µm |

The plating coating deposited on the inside cylinder surface of the cylinder unit used in the present invention has desirably been formed in connection with an improved plating system, the details of which are set forth in a U.S. patent application entitled "Plating Liquid, Plating Method and Plating Cylinder," Ser. No. 08/299,838, filed on Sep. 1, 1994 (claiming priority from Japanese Patent Application No. 218753, filed Sep. 2, 1993), which is hereby incorporated herein by reference. Further, the plating coating deposited on the inside cylinder surface of the cylinder block of the present invention may also be a non-homogenous composite plating coating formed by an improved plating system, the details of which are set forth in U.S. patent applications entitled "Non-homogenous Composite Plating Coating," Ser. No. 08/391,504, filed Feb. 21, 1995, and "Plating Method and Plating System for Non-homogenous Composite Plating Coating," Ser. No. 08/391,505, filed Feb. 21, 1995 (both claiming priority from Japanese Patent Application No. 22640, filed Feb. 21, 1994), which are hereby incorporated herein by reference. Further, the plating coating deposited on the inside cylinder surface of the cylinder unit used in the present invention may also be a plating coating formed in a limited area by an improved plating system, the details of which are set forth in U.S. patent applications entitled "Sleeveless Cylinder Block Without Marginal Plating Coating," Ser. No. 08/406,691, filed Mar. 20, 1995 (claiming priority from Japanese Patent Application No. 74317, filed Mar. 18, 1994), which is hereby incorporated herein by reference.

It will be understood by those of skill in the art that numerous variations and modifications can be made without departing from the spirit of the present invention. Therefore, it should be clearly understood that the forms of the present invention are illustrative only and are not intended to limit the scope of the present invention.

We claim:

1. Sliding contact-making structures in an internal combustion engine, comprising:
    a cylinder unit having an inner plating coating containing a dispersoid substance; and
    a piston provided with at least one piston ring, fitted into the inside of said cylinder in the axial direction so as to freely slide upon the inside surface thereof, said piston ring having a surface in sliding contact with said inside surface, said piston ring sliding surface covered with a vapor deposition layer.

2. The sliding contact-making structures of claim 1, wherein said plating coating has been finished with a honing treatment so as to obtain a surface roughness of 2.0 µmRz or less.

3. The sliding contact-making structures of claim 2, wherein the surface roughness is 1.0 µmRz or less.

4. The sliding contact-making structures of claim 1, wherein said plating coating has been finished with a plateau honing treatment.

5. The sliding contact-making structures of claim 4, wherein said plating coating has grooves with a depth of 1.0–1.8 µm, and ridges with a ratio of the length of a transverse line parallel to the bases of the ridges at a depth of 0.4–0.8 µm, to the length of the bases, of 80%, in the direction traversing the grooves.

6. The sliding contact-making structures of claim 1, wherein said cylinder unit is formed of an aluminum alloy.

7. The sliding contact-making structures of claim 1, wherein said plating coating is a nickel-based plating coating containing a silicon carbon dispersoid.

8. The sliding contact-making structures of claim 1, wherein said plating coating is a nickel-based plating coating containing phosphorus and a silicon carbon dispersoid.

9. The sliding contact-making structures of claim 1, wherein said deposition layer is a physical vapor deposition layer.

10. The sliding contact-making structures of claim 9, wherein said deposition layer is an ion plating deposition layer.

11. The sliding contact-making structures of claim 10, wherein said ion plating deposition layer is of TiN or CrN.

12. The sliding contact-making structures of claim 1, wherein said piston is provided with plural piston rings, and the piston ring on the combustion chamber side is covered with the vapor deposition layer.

13. The sliding contact-making structures of claim 1, wherein, prior to said plating coating, a porous alumite layer has been underlaid.

14. The sliding contact-making structures of claim 1, wherein said sliding contact-making structures are in a four-cycle engine.

15. An internal combustion engine comprising:
 a cylinder unit having an inner plating coating containing a dispersoid substance; and
 a piston provided with at least one piston ring, fitted into the inside of said cylinder in the axial direction so as to freely slide upon the inside surface thereof, said piston ring having a surface in sliding contact with said inside surface while sliding, said piston ring sliding surface covered with a vapor deposition layer.

16. The internal combustion engine of claim 15, wherein said plating coating has been finished with a honing treatment so as to obtain a surface roughness of 2.0 μmRz or less.

17. The internal combustion engine of claim 16, wherein the surface roughness is 1.0 μmRz or less.

18. The internal combustion engine of claim 15, wherein said plating coating has been finished with a plateau honing treatment.

19. The internal combustion engine of claim 18, wherein said plating coating has a groove depth of 1.0–1.8 μm, and ridges with a ratio of the length of a transverse line parallel to the bases of the ridges at a depth of 0.4–0.8 μm, to the length of the bases, of 80%, in the direction traversing the grooves of 0.4–0.8 μm.

20. The internal combustion engine of claim 15, wherein said cylinder unit is formed of an aluminum alloy.

21. The internal combustion engine of claim 15, wherein said plating coating is a nickel-based plating coating containing a silicon carbon dispersoid.

22. The internal combustion engine of claim 15, wherein said plating coating is a nickel-based plating coating containing phosphorus and a silicon carbon dispersoid.

23. The internal combustion engine of claim 15, wherein said deposition layer is a physical vapor deposition layer.

24. The internal combustion engine of claim 23, wherein said deposition layer is an ion plating deposition layer.

25. The internal combustion engine of claim 24, wherein said ion plating deposition layer is of TiN or CrN.

26. The internal combustion engine of claim 15, wherein, prior to said plating coating, a porous alumite layer has been underlaid.

27. The internal combustion engine of claim 15, wherein said engine is a four-cycle engine.

28. The internal combustion engine of claim 15, wherein said plating coating covers at least the area from the point said piston ring reaches when said piston is at the upper dead point position, to the point said piston ring reaches when said piston is at the lower dead point position.

29. The internal combustion engine of claim 15, wherein said piston comprises a piston body in which the piston ring is installed, a connecting bar for connecting said piston body with a crank, and a piston pin for connecting said piston body with said connecting bar, said piston having a ratio of the length between the center of said piston pin and the lower end of said piston body to the length between the upper end of said piston body and the center of said piston pin, of 1/3–2/3.

30. The internal combustion engine of claim 25, wherein said piston is provided with plural piston rings, and the piston ring on the combustion chamber side is covered with a vapor deposition layer.

* * * * *